(12) United States Patent
Siegwart

(10) Patent No.: US 6,460,035 B1
(45) Date of Patent: *Oct. 1, 2002

(54) PROBABILISTIC DATA CLUSTERING

(75) Inventor: David Kevin Siegwart, Headington (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,253

(22) Filed: Jan. 8, 1999

(30) Foreign Application Priority Data

Jan. 10, 1998 (GB) .............................. 9800427

(51) Int. Cl.⁷ .............................. G06F 17/00
(52) U.S. Cl. ................. 707/6; 707/10; 707/5
(58) Field of Search ............... 707/1, 5, 6, 7, 707/10, 102, 104; 709/241; 340/995; 434/362; 704/236, 256; 702/181; 706/12

(56) References Cited

U.S. PATENT DOCUMENTS

| | | | | |
|---|---|---|---|---|
| 5,237,678 A | * | 8/1993 | Kuech et al. ................. 707/5 |
| 5,311,173 A | * | 5/1994 | Komura et al. ............. 340/995 |
| 5,465,321 A | * | 11/1995 | Smyth ......................... 706/20 |
| 5,608,840 A | * | 3/1997 | Tsuboka .................... 704/236 |
| 5,638,489 A | * | 6/1997 | Tsuboka .................... 704/256 |
| 5,704,017 A | * | 12/1997 | Heckerman et al. .......... 706/12 |
| 5,884,311 A | * | 3/1999 | Blattmann-Bleile et al. .. 707/10 |
| 5,930,803 A | * | 7/1999 | Becker et al. .............. 707/104 |
| 6,012,058 A | * | 1/2000 | Fayyad et al. ................. 707/6 |
| 6,021,383 A | * | 2/2000 | Domany et al. ............ 702/181 |
| 6,032,146 A | * | 2/2000 | Chadha et al. ................. 707/6 |
| 6,049,797 A | * | 4/2000 | Guha et al. .................... 707/6 |
| 6,067,572 A | * | 5/2000 | Jensen et al. ............... 709/241 |
| 6,115,708 A | * | 9/2000 | Fayyad et al. ................. 707/6 |
| 6,144,838 A | * | 11/2000 | Sheehan ..................... 434/362 |

* cited by examiner

Primary Examiner—Hosain T. Alam
Assistant Examiner—Anh Ly
(74) Attorney, Agent, or Firm—Ronald L. Drumheller

(57) ABSTRACT

A component of a data clusterer is used to determine a conditional probability density of an object (data point) lying in a cluster. The object has a discrete ordinal attribute value within a finite range of attribute values. The conditional probability density for the discrete ordinal attribute is a function of an integral of a conditional probability function across a sub-range of the discrete ordinal attribute range of values, the sub-range comprising an upper bound and a lower bound bounding the discrete ordinal attribute value.

6 Claims, 5 Drawing Sheets

PROBABILISTIC DATA CLUSTERING

FIELD OF THE INVENTION

The present invention relates to a probabilistic approach to data clustering in a data mining system.

BACKGROUND OF THE INVENTION

Data mining systems are employed to analyze data sets comprising a plurality of objects each object having a set of attributes. An object could for example represent a survey respondent, and object attributes could be a series of answers the respondent has provided for the survey. Each attribute can be divided into one of three types: continuous, discrete ordinal and categorical (discrete nominal).

Continuous attributes include exact, or quasi exact, answers within an ordered scale for the attribute, for example, where the respondent inserts the exact amount of their salary. Two continuous attributes can be compared for equality, they can be ordered with respect to each other, and a numerical distance measure can be made of the size of their dissimilarity.

Discrete ordinal attributes include answers divided into bins or bands within an ordered range, for example, where a question asks for a respondents age, the respondent answers that their age is in one of the bands 0–25, 25–50, or 50+ years of age, thus the information is termed partially missing in the sense that the exact attribute value cannot be determined from the information provided. Such a question could be put in the form of a question requiring an exact answer to provide a continuous value, but this is often seen as intrusive, and survey respondents may be unwilling to provide such information. Two discrete ordinal attributes can nonetheless be tested for equality, and for ordering, however a distance measure cannot always be made of the size of their dissimilarity. Hence a discrete ordinal attribute is one that is like a continuous attribute but only the ordering of the attributes is known.

It is acknowledged that an example of a discrete ordinal attribute is the number of children in a family. Here the discrete value is an exact representation of the quantity, and a distance measure can be made between two families. However, where the attribute is the price band of a house or a person's age band as above, the underlying quantity for the discrete value is a continuous one, but the discrete value is an approximation to the real value of the house or the age of the person, and a distance measure cannot be found, because bands made be of different sizes.

Categorical or discrete nominal attributes include answers divided into unordered bands, for example, house location or make or colour of car. Two categorical attributes can only be checked for equality, ordering has no meaning.

Data mining systems are known which analyze data sets to define one or more non-probabilistic clusters. These clusters can then be used to test individual objects or other data sets against the pre-defined clusters. FIG. 1 shows an example where three clusters C1 . . . C3 have been pre-defined for a data set including salary and age attributes. This data set although extremely simple could be used, for example, by a financial institution to decide whether a respondent is a suitable candidate for a loan. The model can be used to test the answers provided by respondents x, y and z regardless of whether they are continuous or discrete. The clusters are non-probabilistic in that respondents are considered to either lie inside or outside a cluster, that is, they have a probability of either 0 or 1 of being in a cluster. Using such a non-probabilistic (NP) analysis, the respondent z would be seen to lie inside cluster 1, whereas the respondents x and y would be seen not to lie in any cluster. The results of the analysis are displayed in FIG. 2, which illustrates that the only information gained from the respondents is that the respondent z is definitely in cluster C1, whereas the other respondents definitely do not fit any cluster. It will be seen, however, that the respondent x is much closer to fitting into the model than the respondent y, yet this information is lost in the analysis.

It is acknowledged that some non-probabilistic data mining systems can define clusters to fill all possible object attribute values, rather than the above example where some of the space if left undefined. In such a case, the points x and y, rather than not lying in any cluster, would be deemed to lie in a cluster for which they are really not appropriate.

Furthermore, because the non-probabilistic approach can not properly take into account "how far" a respondent may be from lying in or outside a cluster, it has little possibility of detecting very unusual responses which may be indicative of fraud. Non-probabilistic data analysis systems try to overcome this problem by defining "fraudulent" clusters, but because fraudulent activity is relatively rare, definition of such clusters is difficult.

Probabilistic approaches to data analysis are known. In speech recognition information is provided as a continuous data in the form of amplitude or frequency information, and a speech processor may need to allocate a probability of between 0 and 1 that a speech pattern matches one or more phonemes. Similarly, a probabilistic approach has been used in relation to categorical data in for example clinical research, where respondents provide information in relation to types of symptoms experienced.

However, a probabilistic approach has not been employed properly in the field of data mining particularly because of the difficulties and shortcomings in dealing with discrete ordinal attributes.

DISCLOSURE OF THE INVENTION

In a first aspect, the present invention provides a component of a data clusterer adapted to determine a conditional probability density of an object lying in a cluster; said object having a discrete ordinal attribute value within a finite range of attribute values, said conditional probability density for said discrete ordinal attribute being a function of an integral of a conditional probability function across a sub-range of said discrete ordinal attribute range of values, said sub-range comprising an upper bound and a lower bound bounding said discrete ordinal attribute value.

In a second aspect, the present invention provides a data mining system adapted to generate a cluster model from a data set comprising a plurality of objects, each object including a plurality of attributes, said attributes including a set of discrete ordinal attributes, said system including an iterative cluster definition means, the or each cluster having a distribution attribute associated with each of said set of discrete ordinal attributes, said cluster definition means including: means for determining, for each cluster, a conditional probability density ($p_j(x,z,q)$) of an object lying in a cluster; means for determining, for each cluster and for each object, a posterior probability ($h_{ij}$) of an object lying in a cluster, said posterior probability being a function of said conditional probability density of the cluster ($p_j(x,z,q)$), a mixing fraction for said cluster ($\alpha_j$) and an unconditional probability density ($p(x,z,q)$); and means for determining, for each object attribute and for each cluster, a next cluster distribution attribute ($\mu_{jk}, V_{jk}; v_{jk}, W_{jk}; \pi_{jk}, c_{jk}$), said distribution attribute being a function of said posterior probability, said object attribute value and a sum of said posterior probabilities; wherein said means for determining the conditional probability density of an object lying in a cluster is characterised by means for determining the conditional probability density of an object having a discrete ordinal attribute value within a finite range of attribute values lying in a cluster, said conditional probability density for said discrete ordinal attribute being a function of an integral of a conditional probability function across a sub-range of said discrete ordinal attribute range of values, said sub-range comprising an upper bound and a lower bound bounding said discrete ordinal attribute value.

After the generation of the cluster model, the present invention can be used for further analysis on new data sets:
- to generate a cluster membership value, which is the probability of an object having given attributes belonging to a cluster.
- to generate confidence or novelty (=1−confidence) values associated with an object, that indicates how likely it is that the object comes from the same distribution as the training data set.

DESCRIPTION OF THE PREFERRED EMBODIMENT

Figure 1:
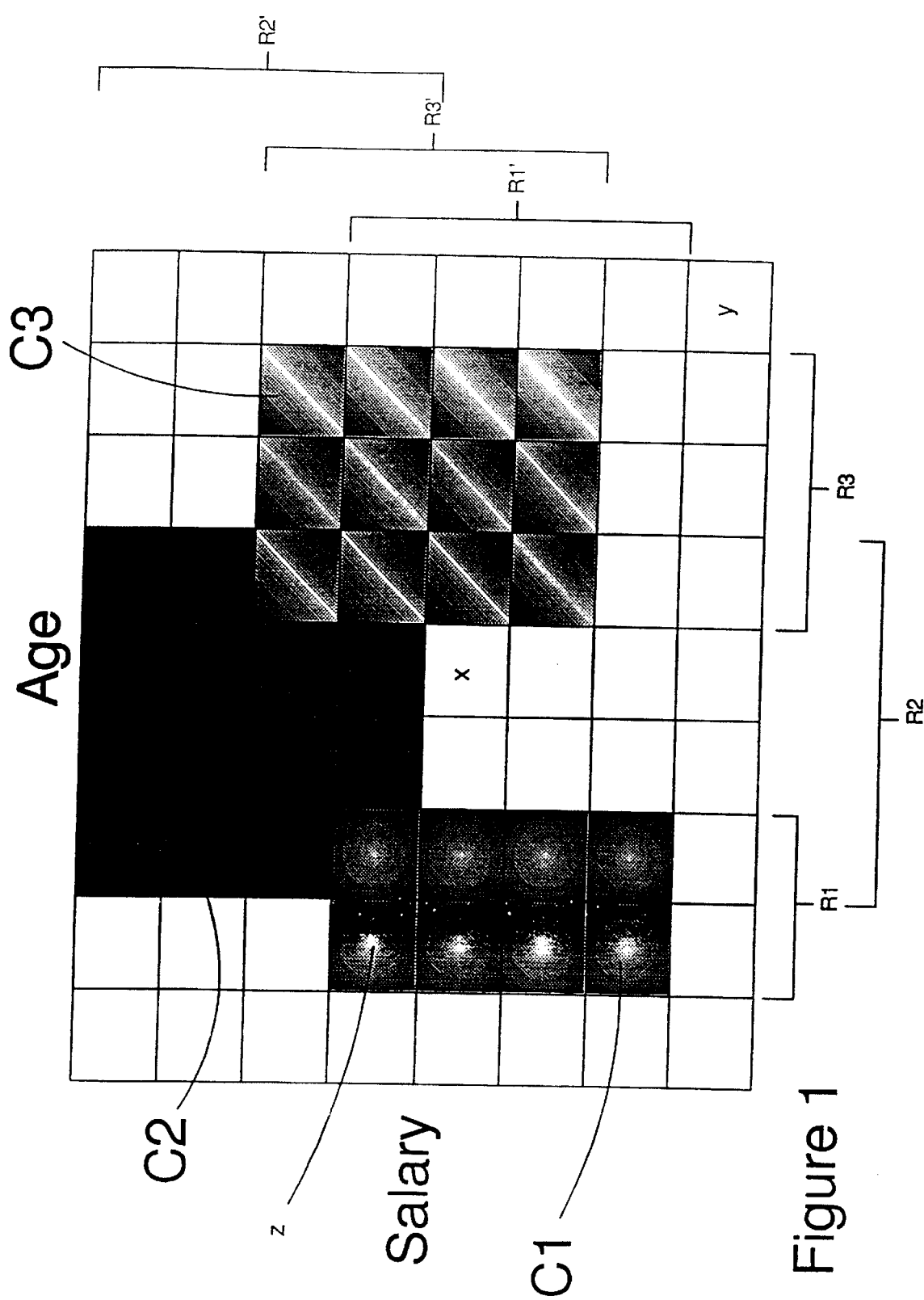
FIG. 1 is a diagram illustrating a non-probabilistic approach to data clustering.

The present invention is used to generate a cluster model. Each cluster in the model needs to be defined for each attribute, or dimension, of a data set. If we examine the non-probabilistic model of FIG. 1, each of the clusters C1, C2 and C3 have a respective range R1, R2, R3 for the age attribute and a respective range R1', R2' and R3' for the salary attribute.

Figure 4:
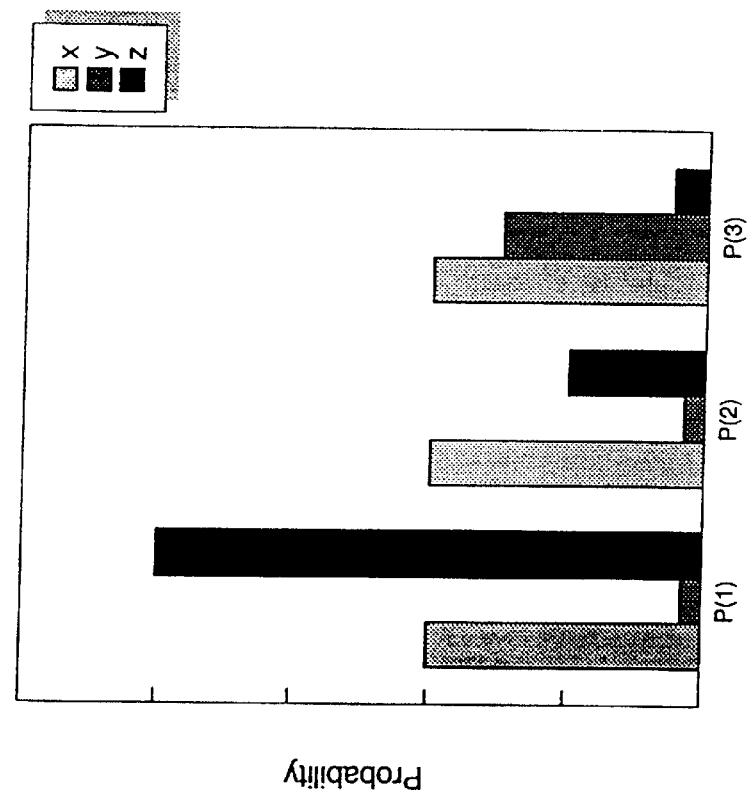
FIG. 4 is a diagram illustrating the results gained for objects x, y and z using the clusters of FIG. 3.
Figure 2:
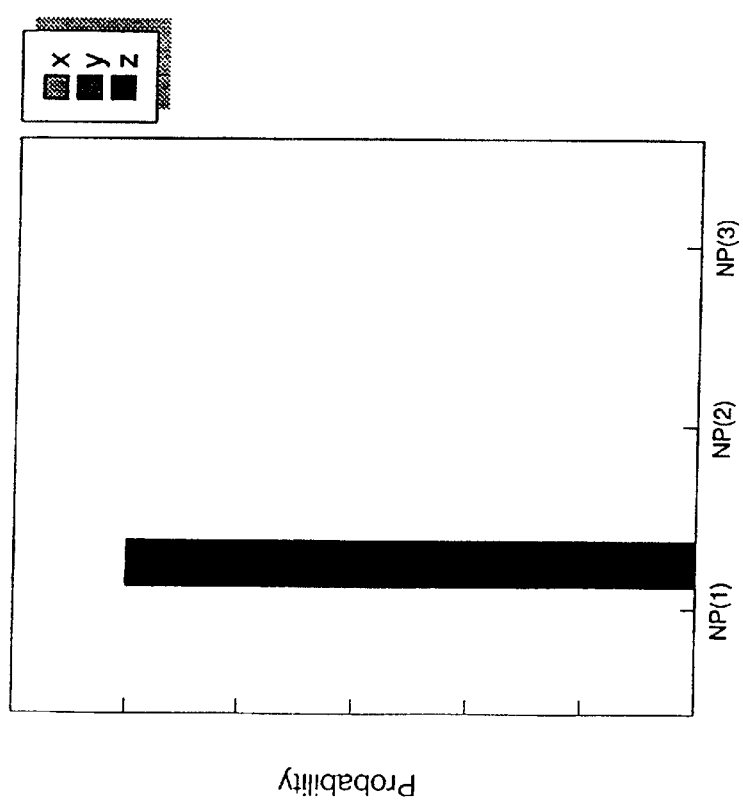
FIG. 2 is a diagram illustrating the results gained for objects x, y and z using the clusters of FIG. 1.
Figure 3:
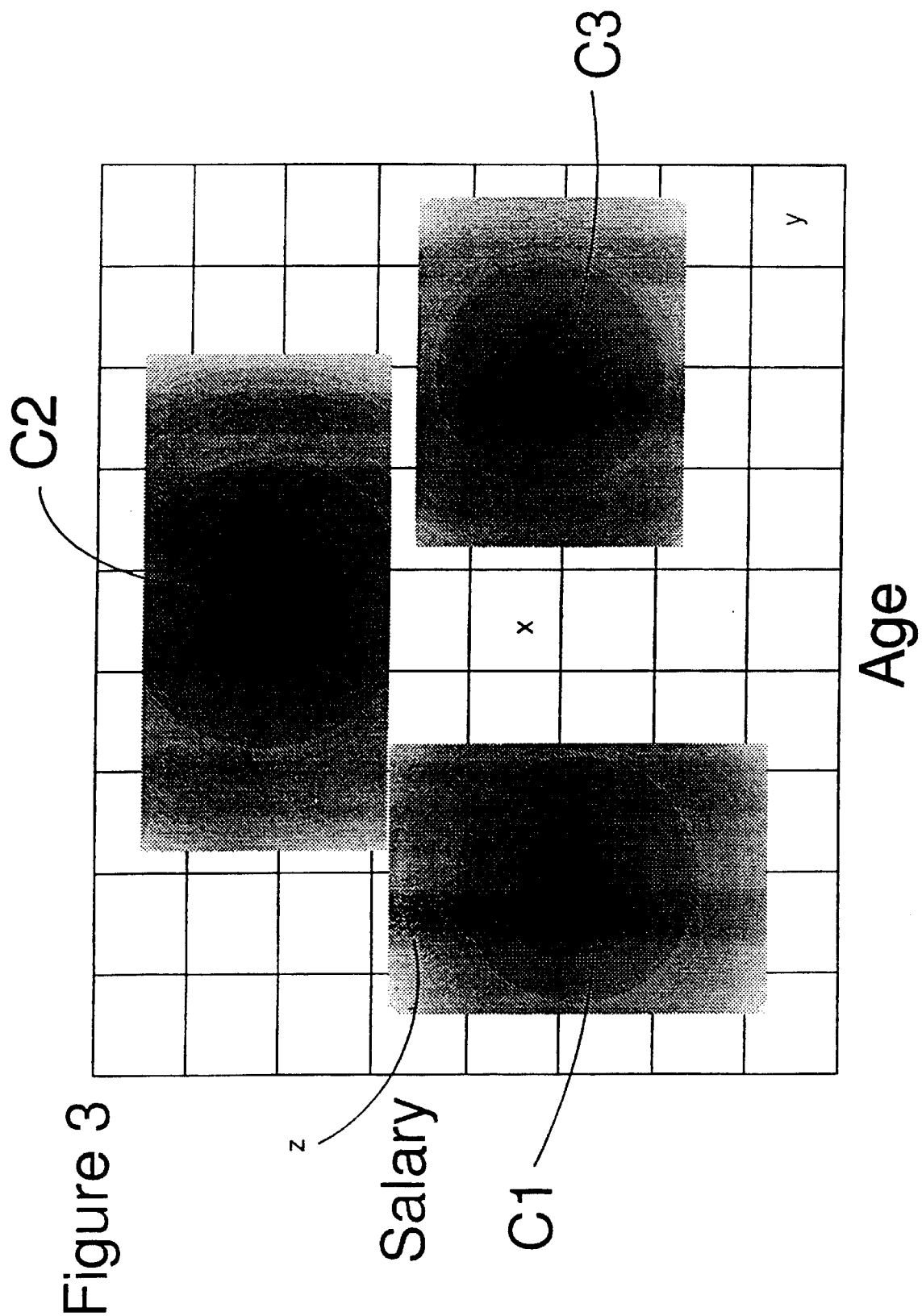
FIG. 3 is a diagram illustrating a probabilistic approach to data clustering according to the present invention.

A probabilistic model generated using the present invention, FIG. 3, includes a mixture of cluster definitions for each real, categorical and discrete ordinal attribute of a data set. The model relies on generating a conditional probability density of an object lying in any cluster. In FIG. 4, where the conditional probability values are not shown to scale, z is shown to have a high probability P(1) of lying in cluster 1 and a lower probability P(2), P(3) of lying in cluster 2 or 3. The results for the other points are much more interesting because it can be seen for the results for point x that it is much closer to fitting the clusters, than the point y, and this can be used either to iteratively improve the cluster model or to make a different determination about point x than point y.

In describing the probabilistic approach of the present embodiment, some labelling conventions are used. The data set has i=1, . . . ,N objects and the cluster model has j=1, . . . ,$n_c$ clusters. Each cluster has the following model assumptions:

- for continuous attributes, the clusters are distributed normally, each cluster having a mean and covariance $\mu$ and V respectively;
- for discrete ordinal attributes, the clusters are also distributed normally, having a mean and covariance v and W respectively, but data are considered as partially missing, that is, the discrete value represents a range of missing real values between some limits; and
- for categorical attributes the clusters are distributed as a simplification of the multinominal distribution. Here, a cluster is characterised by a highest conditional probability $\pi$ of the distribution, at modal point c.

Each object has dx continuous attributes forming a vector $x=(x_1, \ldots, x_{dx})$, dz discrete ordinal attributes forming a vector $z=(z_1, \ldots z_{dz})$ and dq categorical attributes forming a vector $q=(q1, \ldots, q_{dq})$. Also each categorical attribute $q_k$ has $L_k$ possible states (categories).

The conditional probability density $p_j(x,z,q)$ of an object lying in a cluster j is defined as:

$$p_j(x, z, q) = \prod_{k=1}^{d_x} g(x_k; \mu_{jk}, V_{jk}) \prod_{k=1}^{d_z} P(z_k; v_{jk}, W_{jk}) \prod_{k=1}^{d_q} \{\pi_{jk} \delta_{qc_{jk}} + \underline{\pi_{jk}}(1 - \delta_{qc_{jk}})\} \quad (1)$$

It is assumed that the covariances are diagonal with diagonal elements $V_{jk}$, k=1 . . . dx, and $W_{jk}$, k=1 . . . dz.

Each cluster j has a mixing fraction (cluster prior) $\alpha_j$, being the probability of belonging to a cluster j. The sum of all $\alpha_j$, j=1 . . . $n_c$ is 1. Thus, an unconditional probability density function is given by:

$$p(x, z, q) = \sum_{j=1}^{n_c} \alpha_j p_j(x, z, q) \quad (2)$$

This is the overall model of the probability distribution of the data which has sub-components that are the distributions for individual clusters.

Equation (1) defining the conditional probability density for any point has a continuous attribute component where:

$$g(x_k; \mu_{jk}, V_{jk}) = \exp(-(x_k - \mu_{jk})^2 / 2V_{jk}) / \sqrt{2\pi V_{jk}}$$

and a discrete ordinal attribute component where:

$$P(z_k; v_{jk}, W_{jk}) = \int_{\underline{\zeta_k}(z_k)}^{\overline{\zeta_k}(z_k)} \frac{1}{\sqrt{2\pi W_{jk}}} \exp\left\{-\frac{1}{2}(\zeta_k - v_{jk})^2 / W_{jk}\right\} d\zeta_k \quad (4)$$

$P(z_k; v_{jk}, W_{jk})$ is the conditional probability that $z_k$ belongs to cluster j, that is, $\zeta$, with $\zeta \in [\underline{\zeta}(z_k), \overline{\zeta}(z_k)]$ belongs to cluster j. This is a function of an hypothetical continuous Gaussian distribution on $\zeta$ with mean $v_{jk}$ and variance $W_{jk}$, assumed to underlie $z_k$.

Figure 5:
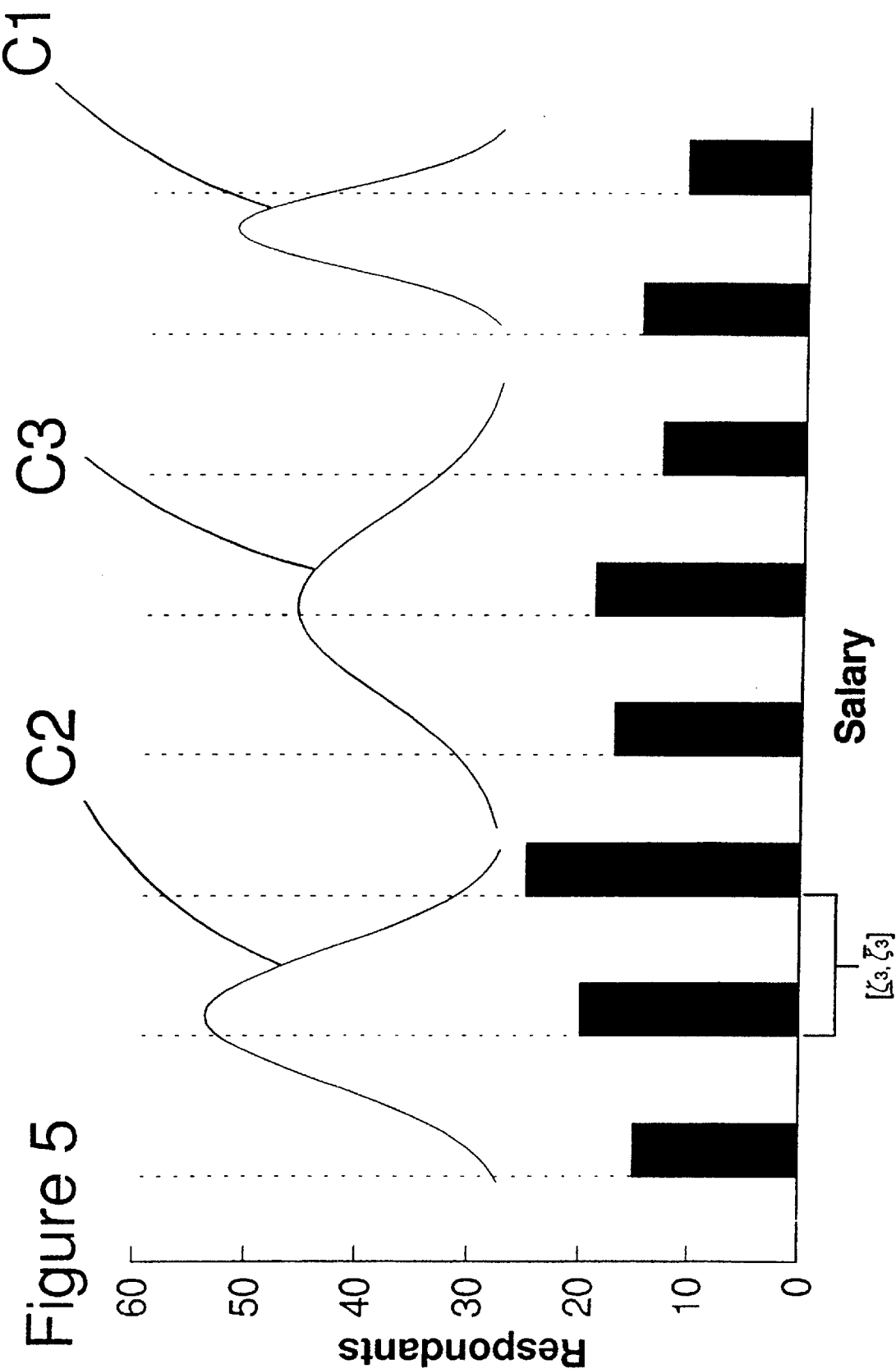
FIG. 5 is a diagram illustrating the relation between data clusters and data for a discrete ordinal attribute divided into bands.

A problem arises in choosing the upper and lower bounds for $\zeta$, in equation (4). In the present invention, where a discrete ordinal attribute is divided into bands, for example, FIG. 5, the upper and lower bounds for $\zeta$ are chosen as the upper and lower boundaries for the band into which the discrete ordinal attribute value falls. If, in the example of FIG. 5, a respondent replies that their salary falls in the third band having upper and lower bounds of, say £15,000 and £10,000 respectively, these values are used in equation (4) for this attribute.

It will be seen of course that for every object having the same attribute value, ie. falling in the same salary band, the result of the integration will be the same, given the same mean and variance for a cluster. The result can therefore be pre-calculated and stored in a look up table to reduce processing time.

Figure 6:
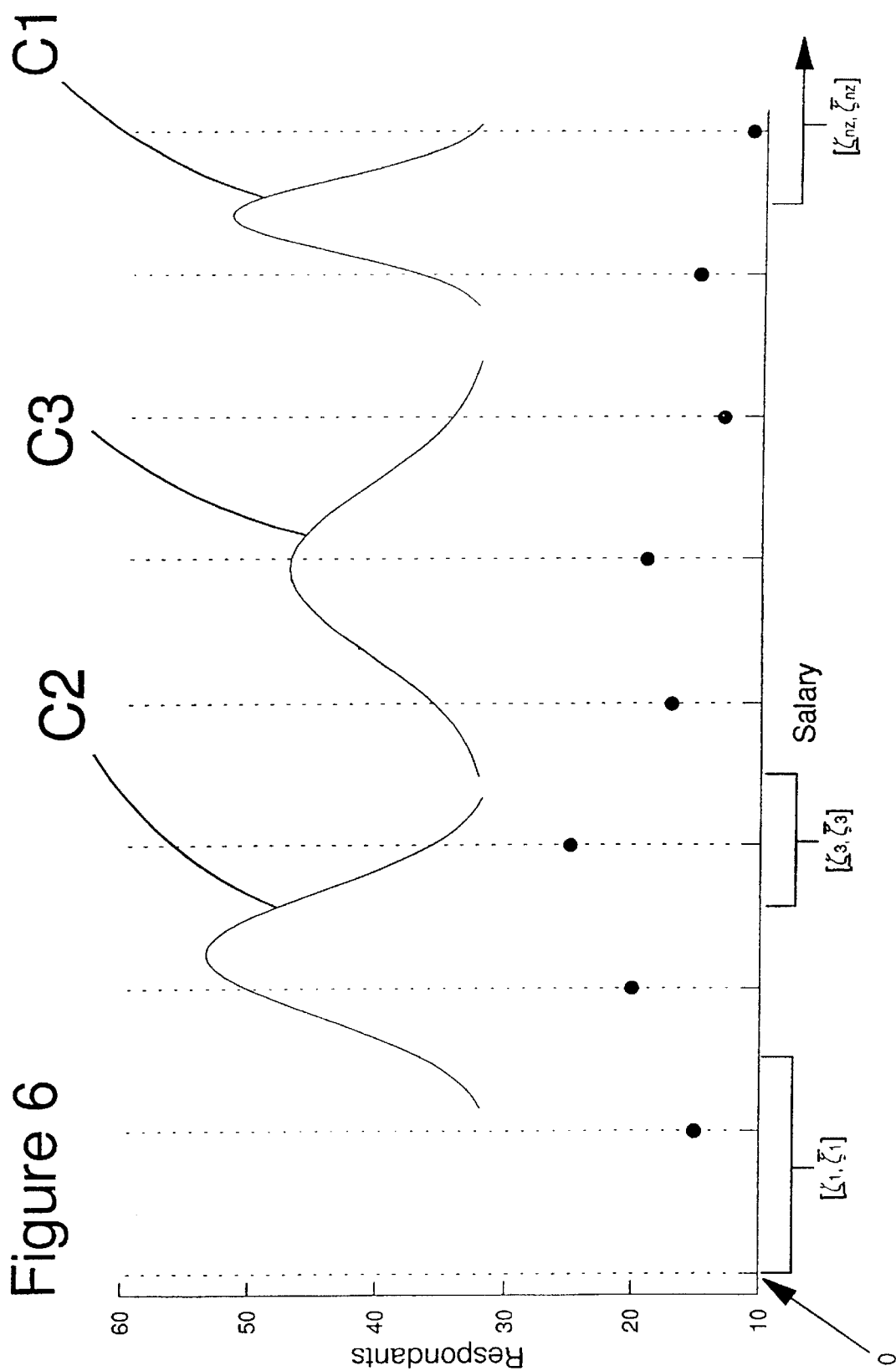
FIG. 6 is a diagram illustrating the relation between data clusters and data for a discrete ordinal attribute divided into bins.

If on the other hand, a respondent is asked to give their salary to the nearest £10,000 pounds, FIG. 6, the upper and lower bounds for $\zeta$ need to be calculated differently. In the present embodiment, if we suppose a discrete ordinal attribute can take the values $z_c$, $c=1, \ldots, n_z$, then the upper and lower bounds are defined as follows:

$$\underline{\zeta}(z_c) = \overline{\zeta}(z_c - 1) = (z_c - 1 + z_c)/2$$

and at the end defines:

$$\underline{\zeta}(z_1) = -\infty, \overline{\zeta}(z_{n_z}) = +\infty$$

It will be seen that the use of infinite upper and lower bounds at the end points may not be suitable when it is known that the end points of an attribute may be finite, for example, age or salary should not be negative. If such information is available, then suitable changes can be made to the end point conditions. Thus, in the case of FIG. 6, the lower bound for $\zeta_1$ can be set to 0 rather than $-\infty$.

Referring now to the categorical component of Equation (1). In a multinominal distribution, each categorical attribute has a probability for each cluster of being in each category. Such a model has an explosive number of parameters, hence in the present embodiment a simplified model is employed. Here, only the model probability $\pi$ and its category $c$ are required.

Thus, the categorical attribute component of equation (1) simply means that if an object attribute value corresponds with the modal value $c_{jk}$ for a cluster then its conditional probability is $\pi_{jk}$, otherwise the conditional probability is $\underline{\pi}_{jk}$. The component is defined as a function of $\pi_{ij}$, the Kronecker delta for ease of symbolic manipulation. $\underline{\pi}_{jk}$ which is the conditional probability of attribute $q_k$ (given it belongs to cluster j), not being modal value $c_{jk}$, is thus given by $$\underline{\pi}_{jk} = (1 - \pi_{jk})/(L_k - 1)$$

where $L_k$ is the number of categories or states for the categorical attribute.

From the probability densities of equations (1) and (2), a posterior probability $h_{ij}$ of an object $(x_i, z_i, q_i)$ belonging to cluster j, is given by:

$$h_{ij} = \alpha_j p_j^{(obs)}(x_i, z_i, q_i)/p^{(obs)}(x_i, z_i, q_i)$$

where the observed (obs) label indicates that when an attribute value is missing the term associated with that attribute (inside one of the products in the equation for $p_j$ above) is replaced by the factor 1. Also, $$h_j = \sum_{i=1}^{N} h_{ij}$$

If we define $X_k$ as the set of observed (non-missing) values of x for attribute k, $Q_k$ as the corresponding set for q, and $Z_k$ for z, we can further define:

$$h_{jk}^{x\langle abs \rangle} = \sum_{x_{ik} \in X_k} h_{ij}$$

$$h_{jk}^{z\langle abs \rangle} = \sum_{z_{ik} \in Z_k} h_{ij}$$

$$h_{jk}^{q\langle abs \rangle} = \sum_{q_{ik} \in Q_k} h_{ij}$$

With these probabilities defined the means, variances and modes for each types of attribute can be iteratively calculated. The method according to the invention begins by calculating expectation values of the missing values given the data that is known, and given an a priori probability model (either from a previous iteration or by an initial guess). The likelihood is then maximised to give the updated model parameters. It has been shown quite generally that each iteration will not decrease the likelihood. The missing data can also take the form of missing values in the objects themselves.

In the following equations, hatted variables denote new values for mean variance or mode, and unhatted variables reflect the old values:

For continuous attributes:

$$\hat{\mu}_{jk} = (1/h_{jk}^{x\langle abs \rangle}) \sum_{x_{ik} \in X_k} h_{ij} x_{ik}$$

$$\hat{V}_{jk} = (1/h_{jk}^{x\langle abs \rangle}) \sum_{x_{ik} \in X_k} h_{ij}(x_{ik} - \hat{\mu}_{jk})^2$$

For discrete ordinal attributes:

$$\hat{v}_{jk} = (1/h_{jk}^{z\langle abs \rangle}) \sum_{z_{ik} \in Z_k} h_{ij} E(\zeta_k | j, v_j, W_j, \zeta_k \in [\underline{\zeta}(z_{ik}), \overline{\zeta}(z_{ik})])$$

$$\hat{W}_{jk} = (1/h_{jk}^{z\langle abs \rangle}) \sum_{z_{ik} \in Z_k} h_{ij} E((\zeta_k - \hat{v}_{jk})^2 | j, v_j, W_j, \zeta_k \in [\underline{\zeta}(z_{ik}), \overline{\zeta}(z_{ik})])$$

where $E(\cdot | j, v_j, W_j, \zeta_k \in [\underline{\zeta}(z_k)])$ is the expectation of $(\cdot)$ given the means $v$, covariances $W$ and given that $\zeta_k$ lies in the range $[\underline{\zeta}(z_k), \overline{\zeta}(z_k)]$ and that the object comes from cluster j.

For categorical attributes:

$$\pi_{jkc} = (1/h_{jk}^{q\langle abs \rangle}) \sum_{q_{ik} \in Q_k} h_{ij} \delta_{c q_{ik}}$$

$$\hat{\pi}_{jk} = \max_{c=1,\ldots,L_k} \pi_{jkc}$$

$\hat{c}_{jk}c$ such that $\hat{\pi}_{jk} = \pi_{jkc}$

In all cases:

$$\hat{\alpha} = h_j/N$$

This long list of equations appears quite formidable, so it is worth restating that the iteration is a map, $$(\alpha_j, \mu_j, V_j, v_j, W_j, c_j, \pi_j) \rightarrow (\hat{\alpha}_j, \hat{\mu}_j, \hat{V}_j, \hat{v}_j, \hat{W}_j, \hat{c}_j, \hat{\pi}_j)$$

that increases the likelihood of the data set of objects. Most of the steps are simple to calculate. The only steps that are slow are the evaluation of $h_{ij}$ involving the calculation of exponentials, and the evaluation of the expectations over discrete ordinal attributes. However a simple technique can be used to make the discrete calculations insignificant for large data sets. First note that the calculations depend on only a small set of possible parameters (due to the discretization and to statistical independence within a cluster of the attributes). As indicated previously, these integrals can be precalculated and stored in a table, removing them from the inner loop which is the kernel of the algorithm. The table is indexed by the ordinal associated with the band $[\zeta(z_k),\overline{\zeta}(z_k)]$. So the dimensions of this table depend only on the number of possible bands. This is small, and in the present embodiment, a threshold of fifty is set, above which the attribute is regarded as continuous.

By iterating the above steps, a closer approximation is made to the best mixture of clusters for the data set. By calculating the log-likelihood:

$$Likelihood = \sum_{i=1}^{N} \log p(x_i, z_i, q_i)$$

at each step (which involves no additional expense being a spin-off from the $h_{ij}$ calculation), one can assess convergence. Unfortunately convergence can be very slow for some iterations, when the solution is stuck in a gentle narrow valley or ridge of parameter space. It is often advisable to iterate for a large number of steps.

Note also that for each parameter of each cluster and each attribute there is a sum through the whole data set. This is known as a batch algorithm because the whole data set needs to be stored in memory to cope with the large number of accesses required. The present invention also provides a more convenient, and less memory demanding, set of equations written in a sequential form such that the iteration steps are broken down into N steps one for each object, so that after a object is used once it need not be accessed again until the next iteration.

The sequential algorithm needs to be of the form $$(\hat{\alpha}_j,\hat{\mu}_j,\hat{V}_j,\hat{v}_j,\hat{W}_j,\hat{c}_j,\hat{\pi}_j)=T_s(\alpha_j,\mu_j,V_j,v_j,W_j,c_j,\pi_j;r)$$

where the sequential algorithm depends on only one point r.

$h_{ij}$ is defined as before. For continuous attributes, an iterative form is defined for $h_{jk}^{x(obs)}$, that is applied only if the attribute $x_{ik}$ is not missing, otherwise $h_{jk}^{x(obs)}$ is left unchanged:

$$\hat{h}_{jk}^{x(obs)}=h_{jk}^{x(obs)}+\delta_{(x_{ik}\in x_k)}h_{ij}$$

In the above equation, the Kronecker-like delta, $\delta_L$, is unity if logical statement L is true and zero if L is false. From this, a quantity $\theta_{ij}$ is defined:

$$\theta_{ij}=\delta_{(x_{ik}\in x_h)}h_{ij}/\hat{h}_{jk}^{x(obs)}$$

which is zero when the attribute value is missing, and from this the equations for continuous attributes are:

$$\hat{\mu}_{jk}=\mu_{jk}+\theta_{ij}(x_{ik}-\mu_{jk})$$

$$\hat{V}_{jk}=(1-\theta_{ij})[V_{jk}+\theta_{ij}(x_{ik}-\mu_{jk})^2]$$

Again these equations only have an affect when the attribute $x_{ik}$ is observed. If it is missing the parameters do not change. It can be verified that these equations satisfy the above relationship, and hence the sequential and batch algorithms for the continuous case are mathematically equivalent.

For the discrete ordinal case the following equations are used:

$$\hat{h}_{jk}^{z(obs)}=h_{jk}^{z(obs)}+\delta_{(z_{ik}\in z_k)}h_{ij}$$

$$\psi_{ij}=\delta_{(z_{ik}\in z_k)}h_{ij}/\hat{h}_{jk}^{z(obs)}$$

$$\hat{v}_{jk}=v_{jk}+\psi_{ij}\{E(\zeta_k|v_j^{(O)},W_j^{(O)},\zeta_k\in[\underline{\zeta}_{ik},\overline{\zeta}_{ik}])-v_{jk}\}$$

$$\hat{\xi}_{jk}=\xi_{jk}+\psi_{ij}\{E(\zeta_k^2|v_j^{(O)},W_j^{(O)},\zeta_k\in[\underline{\zeta}_{ik},\overline{\zeta}_{ik}])-\xi_{jk}\}$$

when again the above equations only have an affect if the variable $z_{ik}$ is observed. In these equations the superscript (O) is used to designate that the mean and variance are from a previous iteration through the data set, these value only change between iterations through the data set. After the last object, that is, the end of an iteration, we calculate the new covariance from $\xi$ and $v$.

$$\hat{W}_{jk}=\hat{\xi}_{jk}-\hat{v}_{jk}^2$$

For categorical attributes the following equations are used:

$$\hat{h}_{jk}^{q(obs)}=h_{jk}^{q(obs)}+\delta_{(q_{ik}\in Q_k)}h_{ij}$$

$$\phi_{ij}=\delta_{(q_{ik}\in Q_k)}h_{ij}/\hat{h}_{jk}^{q(obs)}$$

$$\hat{\pi}_{jkc}=\pi_{jkc}+\phi_{ij}\delta_{cq_{ik}}$$

again only applying when $q_{ik}$ is observed. After the last object, the new categorical parameters can be calculated:

$$\hat{\pi}_{jk} = \max_{c=1,\ldots L_k} \hat{\pi}_{jkc}$$

$$\hat{c}_{jk}=cs \cdot t \cdot \hat{\pi}_{jk}=\hat{\pi}_{jkc}$$

The sequential form of the above equations is much more convenient for large data sets on a computer because the values of $h_{ij}$ do not need to be stored in memory. This is quite a significant saving for data sets of the size of 100,000 objects or more.

It will be seen that further improved performance can be achieved by applying a subset of data of increasing size with each iteration of the algorithm to speed up convergence.

The invention therefore has many applications, for example:

FRAUD DETECTION Where fraud is performed by a small proportion of the population, then novelty ranking will detect potentially fraudulent behaviour. The methodology is defined as:

Generate a cluster model using a "clean" training data set, with one data object for each member of the population, where the attributes of each object are attributes that are likely to identify suspect behaviour. "Clean" means that, there may be fraudsters represented in the data, but they must be small in proportion to the rest of the population.

Rank a test set of subjects in terms of the novelty value given by the cluster model.

Plot a graph of novelty of the test subjects against their rank in increasing novelty. Measure the difference from the straight line of unit slope, zero intersect and use a hypothesis test for the distributions of training and test sets being the same.

If the distributions of training and test are the same, then any test subject who has a very high novelty value is 'unusual' and may be a fraudster.

If the distributions of training and test are different, then there are two cases, either:

a. many of the test subjects are fraudsters; or b. the model which was assumed to be stationary has changed with time, and the network needs to be retrained.

We need further expert knowledge to determine which. ANOMALY DETECTION The methodology is the same as above but here the attributes used are those required to potentially exemplify abnormalities or anomalies. For instance:

potential bank account usage may predict attrition;

feature segmentation of MRI scans may distinguish tumours from healthy tissue;

autoregressive co-efficients of electro-encephalogram signals will distinguish normal from abnormal brain states; or sonar reflections from materials will distinguish faulty components from good ones.

Network Validation

1. A supervised neural network is trained using a training set of input and associated output data.

2. A cluster model is generated from the input data only, forming a probability density model of this data.

3. A novelty value is generated for each test subject. High novelty indicates that the neural network is likely to give misleading results that should be rejected.

What is claimed is:

1. A data mining system adapted to generate a cluster model from a data set comprising a plurality of objects, each object including a plurality of attributes, said attributes including a set of discrete ordinal attributes, said system including an iterative cluster definition means, the or each cluster having a distribution attribute associated with each of said set of discrete ordinal attributes, said cluster definition means including:

means for determining, for each cluster, a conditional probability density ($p_j(x,z,q)$) of an object lying in a cluster;

means for determining, for each cluster and for each object, a posterior probability ($h_{ij}$) of an object lying in a cluster, said posterior probability being a function of said conditional probability density of the cluster ($p_j(x,z,q)$), a mixing fraction for said cluster ($\alpha_j$) and an unconditional probability density ($p(x,z,q)$); and means for determining, for each object attribute and for each cluster, a next cluster distribution attribute ($\mu_{jk}$, $V_{jk}$; $v_{jk}$,$W_{jk}$; $\pi_{jk}$,$c_{jk}$), said distribution attribute being a function of said posterior probability, said object attribute value and a sum of said posterior probabilities;

wherein said means for determining the conditional probability density of an object lying in a cluster is characterised by means for determining the conditional probability density of an object having a discrete ordinal attribute value within a finite range of attribute values lying in a cluster, said conditional probability density for said discrete ordinal attribute being a function of an integral of a conditional probability function across a sub-range of said discrete ordinal attribute range of values, said sub-range comprising an upper bound and a lower bound bounding said discrete ordinal attribute value.

2. A data mining system as claimed in claim 1 wherein said object attributes further comprise a set of continuous attributes and a set of categorical attributes, and the or each cluster has a distribution attribute associated with each of said set of continuous attributes and a distribution attribute associated with each of said set of categorical attributes, said conditional probability density further comprising a continuous component and a categorical component.

3. A data mining system as claimed in claim 2 said cluster distribution attributes for said continuous attributes comprise respective Gaussian distributions having respective means and variances.

4. A data mining system as claimed in claim 1 wherein said cluster distribution attributes for said discrete ordinal attributes comprise respective Gaussian distributions having respective means and variances.

5. A data mining system as claimed in claim 2 wherein said cluster distribution attributes for said categorical attributes comprise respective distributions having respective modal values and conditional probabilities of said categorical object attribute not being said modal value for said attribute.

6. A data mining system as claimed in claim 1 wherein said sum of said posterior probabilities and said posterior probability are functions of observed object attribute values.

* * * * *